United States Patent [19]

Takagi

[11] Patent Number: 4,782,365
[45] Date of Patent: Nov. 1, 1988

[54] PHOTOGRAPHIC PRINTING APPARATUS AND PAPER MAGAZINE FOR USE THEREWITH

[75] Inventor: Kunio Takagi, Tokyo, Japan

[73] Assignee: Fuji Photo Film Co., Ltd., Kanagawa, Japan

[21] Appl. No.: 927,124

[22] Filed: Nov. 5, 1986

[30] Foreign Application Priority Data

Nov. 5, 1985 [JP] Japan .............................. 60-169181[U]
Nov. 5, 1985 [JP] Japan .............................. 60-169182[U]
Nov. 5, 1985 [JP] Japan ................................. 60-246143

[51] Int. Cl.$^4$ ........................ G03B 7/24; G03B 27/72
[52] U.S. Cl. ...................................... 355/38; 355/41; 355/68; 352/78 C
[58] Field of Search ...................... 355/31, 38, 68, 77, 355/83, 88, 41; 352/78 C; 354/21

[56] References Cited

U.S. PATENT DOCUMENTS 3,907,428 9/1975 Norgaard et al. ................ 355/83 X
4,023,194 5/1977 Batter, Jr. .......................... 352/78 C
4,174,173 11/1979 Poné, Jr. ................................ 355/38
4,431,283 2/1984 Hoda et al. ............................ 354/21

FOREIGN PATENT DOCUMENTS 290075 7/1966 Australia .......................... 352/78 C
1222370 8/1966 Fed. Rep. of Germany .... 352/78 C
1579248 11/1980 United Kingdom .
2065903 7/1981 United Kingdom .
2147712 5/1985 United Kingdom .

Primary Examiner—L. T. Hix
Assistant Examiner—D. Rutledge
Attorney, Agent, or Firm—Young & Thompson

[57] ABSTRACT

A photographic printing apparatus adapted to use a paper magazine having a coded mark indicating the type of a photographic paper contained therein. The code mark is automatically detected, when the paper magazine is mounted on the printing apparatus, by a code mark reader, to judge the paper type according to which the printing apparatus determines the printing conditions and makes a print, thereby to obtain a color print with proper color balance and density.

4 Claims, 4 Drawing Sheets

PHOTOGRAPHIC PRINTING APPARATUS AND PAPER MAGAZINE FOR USE THEREWITH

BACKGROUND OF THE INVENTION

The present invention relates to a photographic printing apparatus, and more particularly relates to a printing apparatus which is adapted to use a paper magazine containing therein a rolled photographic paper. The invention also relates to a paper magazine for use with such an apparatus.

In photographic printing apparatus, it is usual to control correctively the exposures of the three primary color (blue, green and red) components of printing light based on the color densities of a negative picture frame in order to make a fine color print with proper color balance and density. For obtaining the proper exposures, there are several calculation equations well known in the art. According to one of the calculation equations, the proper exposure can be calculated numerically from the values of mean transmittance densities of a specific negative and a picture frame from which a color print is made. That is to say, the proper exposure is the sum of a standard exposure (constant) for the specific negative and an exposure which is the product of a coefficient and the difference in mean transmittance density between the two negatives. In practice, an exposure time for each color is calculated because that exposure is a value of the integration of illumination on a photographic paper with time, the luminosity of the printing light source being constant. The above-described constant and coefficient must be varied in accordance with several factors such as film balances, photographic paper balances, printing lens balances and so forth.

For this reason, conventional printing apparatus has a plurality of printing channels for establishing a constant and a coefficient so as to control correctively the exposure of each color in order to make a fine print with proper color balance and density. The printing channels are selectively used in accordance with combinations of paper balances, lens balances, film balances and so forth. The paper balance which represents the type of photographic paper depends on combinations of paper speeds or sensitivities, emulsion types and surface properties. The lens balance which represents the type of printing lens depends on combinations of printing magnifications, aperture F-numbers and the like. The film balance which represents the type of film such as negative films, reversal films, etc. depends on combinations of film speeds or sensitivities, film formats, and producers who supply films.

Such printing apparatus is adapted to use a paper supply magazine containing a rolled photographic paper therein and a paper take-up magazine in which an exposed photographic paper is wound. The photographic paper in the paper supply magazine is withdrawn therefrom frame by frame, and exposed to form thereon a latent image from a negative at an exposure station. Then the exposed photographic paper is taken up in the paper take-up magazine.

A problem with which conventional printing apparatus is attended is that a manual resetting of paper balance is necessary every time a different photographic paper contained in a paper magazine is used. This manual resetting is executed through keys or dials on an operation panel and is, therefore, troublesome in operation.

OBJECTS OF THE INVENTION

It is therefore an object of the present invention to provide a photographic printing apparatus which allows automatically determining printing conditions without the need to input thereinto information on the paper type of a photographic paper on which prints are made.

It is another object of the present invention to provide a photographic printing apparatus which is adapted to use a paper magazine containing therein a photographic paper on which prints are made, the printing apparatus allowing automatic printing condition determination when the paper magazine is mounted thereon.

SUMMARY OF THE INVENTION

In accordance with the present invention a paper magazine is provided with means for indicating the paper type of a photographic paper contained therein which is automatically detected, when the paper magazine is mounted on a printing apparatus, by detection means to judge its paper type. According to the judged paper type the printing apparatus determines the printing conditions, and makes a print based on the thus-determined printing conditions to obtain a color print with proper color balance and density.

According to a feature of the present invention the detection means is so disposed as to be disposed opposite the paper type indication means when the paper magazine is mounted, allowing the automatic detection of the paper type of a photographic paper contained in the paper magazine. For the paper type indication means, a coded mark is provided on the outside of the housing of the paper magazine and is detected in a binary form by the detection means. This automatic paper type detection can allow printing without the need to pay attention to the paper type of the photographic paper on which prints are made.

BRIEF DESCRIPTION OF THE DRAWINGS

Other objects and advantages of the present invention will become apparent when the following detailed description of preferred embodiments and modifications thereof is read in conjunction with the accompanying drawings, in which.

DETAILED DESCRIPTION OF THE INVENTION

Figure 1:
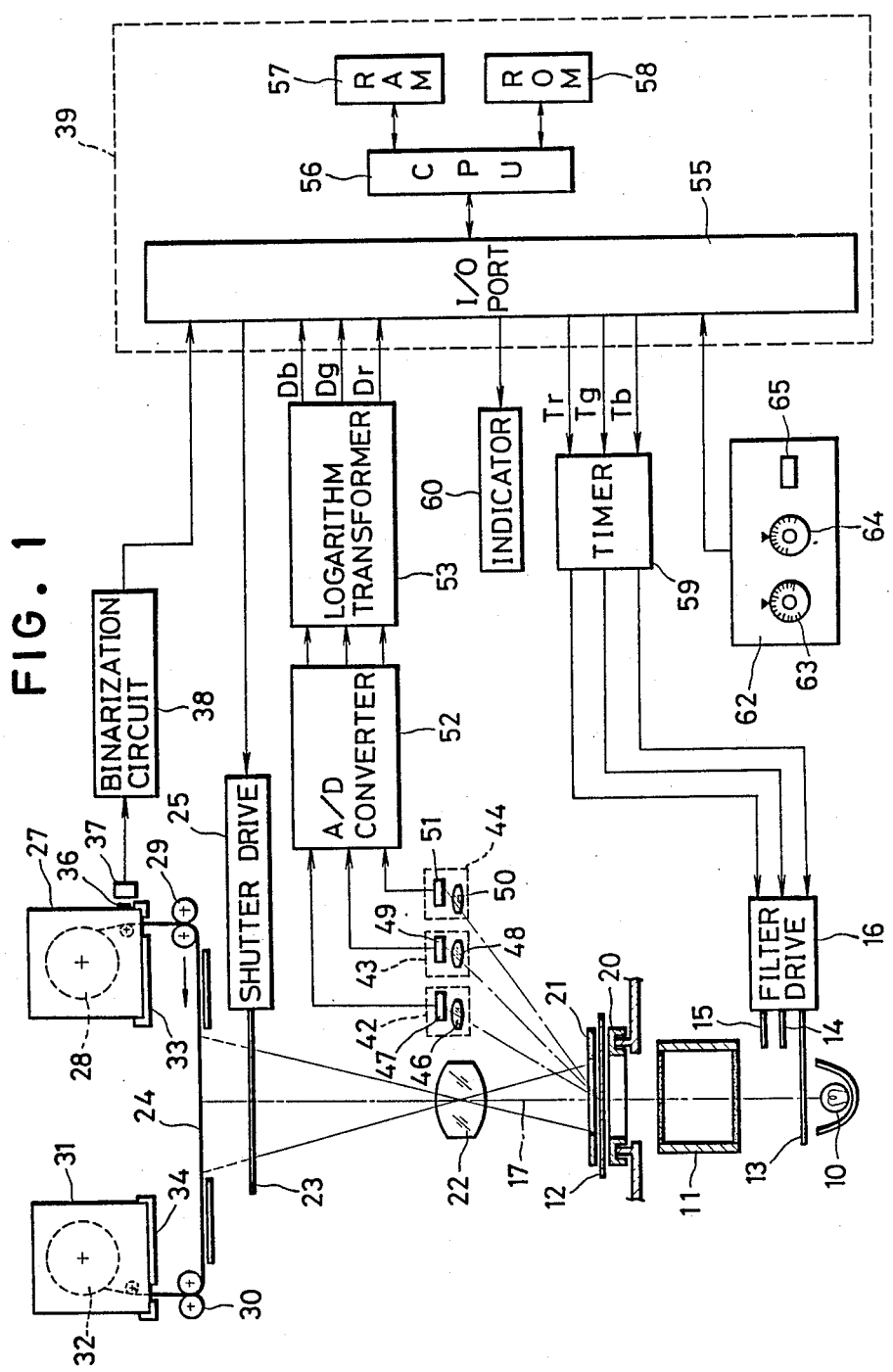
FIG. 1 is a schematic view of a color printing apparatus embodying the present invention.

Referring now to FIG. 1, shown therein is the photographic printing apparatus embodying the present invention. There are shown a white light source 10 and a diffusing box 11 so arranged as to illuminate a color negative film 12, with the result that diffused printing light emerges from the back of the negative film 12.

There are provided, between the white light source 10 and the diffusing box 11, three color filters 13 to 15, namely yellow, magenta and cyan, for cutting off the corresponding complementary color components of the printing light, namely blue, green and red, respectively. Theses color filters 13 to 15 are controlled by a filter drive 16 to enter into the optical path 17 of a projection lens 22.

The color negative film 12 is held by a negative carrier 20 and advanced frame by frame so that a frame from which a print is to be made is placed in the printing station. There is provided, at the printing station, a masking plate 21 having an opening of the same size as the picture frame of the color negative film 12, this masking plate 21 being adapted to press down the color negative film 12 against the negative carrier 20 in order to hold it flat during printing. A shutter 23 is provided to allow the printing light passing through a frame at a printing station to reach a color photographic paper 24, forming a latent image thereon. The shutter 23 is adapted to open and close under the control of a shutter drive 25.

A paper supply magazine 27, which will be described in detail later, includes therein a web-like color photographic paper 24 rolled around a paper supply reel 28. This color photographic paper 24 is withdrawn by a pair of rollers 29 to be placed in the exposure station. After exposure, the color photographic paper 24 is advanced by another pair of rollers 30 so as to be wound around a take-up reel 32 in a paper take-up magazine 31 well known in the art. These paper magazines 27 and 31 are removably mounted on supporting brackets 33 and 34, respectively. The paper supply magazine 27 on a part thereof is provided with a code mark section 36 (see FIG. 2) representing the paper balance information of the photographic paper 24.

Figure 2:
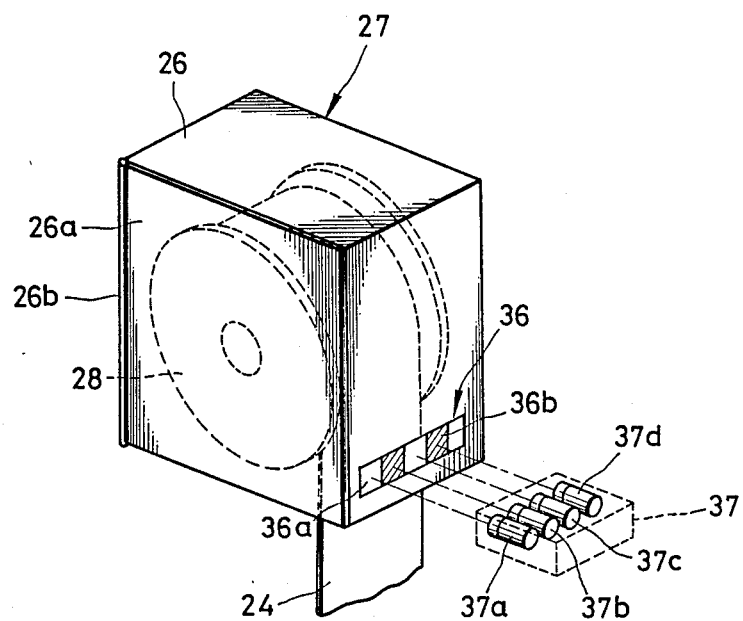
FIG. 2 is a perspective view showing an example of paper magazine.

There is a code mark reader 37 disposed relatively close to the paper supply magazine 27 to read photoelectrically a coded mark on the paper supply magazine 27 when the latter is mounted on the supporting bracket 33. The code mark reader 37, which will be described in more detail in conjunction with FIG. 2, is adapted to receive light reflected from the code mark section 36 of the paper supply magazine 27 and to transmit the received light as an electric signal to a binarization circuit 38 where the signal is converted into a binary signal which in turn is transmitted to a micro-computer 39 serving as a control circuit.

To the lower right of the printing station as seen in FIG. 1, there is provided a photosensor arrangement comprising three units 42, 43 and 44 of lenses 46, 48 and 50 and photosensors 47, 49 and 51, one pair for each primary color, namely blue, green and red. Each lens 46, 48, 50 forms an image of a picture frame on the corresponding photosensor 47, 49, 51. Therefore, the respective photosensors 47, 49 and 51 receive the corresponding color components of the light passing through the entire area of the picture frame and convert them to analog electric signals by color which in turn are transmitted to a logarithm transformer 53 in order to provide large-area transmittance densities Db, Dg and Dr for blue, green and red after having been converted into a digital form by an A/D converter 52. Each large-area transmittance density $D_i$ (where the suffix i means any one of the three primary colors) is transmitted to the micro-computer 39.

The micro-computer 39 serving as a control circuit comprises I/O port 55, CPU 56, RAM 57, and ROM 58, each component per se being well known in the art, which is adapted to execute the control of the components or sections of the printing apparatus and the calculation of exposures on the basis of a programmed sequence stored in the ROM 58. In practice, because the same type of white light source is used, exposure calculation is executed as to an exposure time $T_i$ (where the suffix i means any one of the three primary colors). Based on the exposure times Tr, Tg and Tb, a timer 59 causes the filter drive 16 to control the operation of the filters 13 to 15 for exposure time control. Specifically, the filter drive 16 normally keeps the filters 13 to 15 out of the optical path 17 of the projection lens 22 but, when the shutter 23 is opened responsive to a print start indication to allow the color photographic paper 24 to be exposed to the printing light, drive 16 causes the respective filters 13 to 15 to move into the optical path 17 one after another after the corresponding exposure times Tr, Tg and Tb have elapsed so as to block the corresponding complementary color components of the printing light. An indicator 60 is provided for displaying the paper balance information read by the code mark reader 37.

An operation panel 62, which cooperates with the micro-computer 39, is comprised of a film balance setting dial 63 for inputting information on the types of negative films, a lens balance setting dial 64 for inputting information on the types of projection lenses, and a start key for starting a print. It is to be noted that the film balance setting dial 63 can be replaced by a bar-code reader for reading a bar-code of a negative film printed thereon outside a row of perforations which indicates the type of the negative film. The bar-code reader is desirably disposed just before the printing station and provides a signal indicating the film type which in turn is transmitted to the micro-computer 39. It is desirable to provide a rotatable lens head having a plurality of projection lenses of different focal lengths which are selectively placed in position responsive to manipulation of the lens balance setting dial 64. Furthermore, it is permissible to replace the settihg dials 63 and/or 64 with ten keys or the like.

Reference will now be had to FIG. 2 showing the paper supply magazine 27 in detail. The paper supply magazine 27 includes a box-like housing 26 with a side cover 26a hinged thereto at 26b for opening and closing movement. In the housing 26, the color photographic paper 24 rolled around the supply reel 28 is contained. The housing 26 is provided on a lower portion thereof, close to an outlet slit, with the code mark section 36 comprised of optical marks representing the paper balance of the photographing paper 24 contained therein. This paper balance, as was described previously, depends on a combination of the paper speed, the type of the photographic paper and the surface properties of the photographic paper. The code mark is comprised of white marks (high reflectance marks) 36a and black marks (low reflectance marks) 36b which are so arranged as to code the paper balance of the photographic paper 24. In this illustrated embodiment, four-bits code marks are used which can indicate a maximum of 12 types of paper balances.

Figure 3:
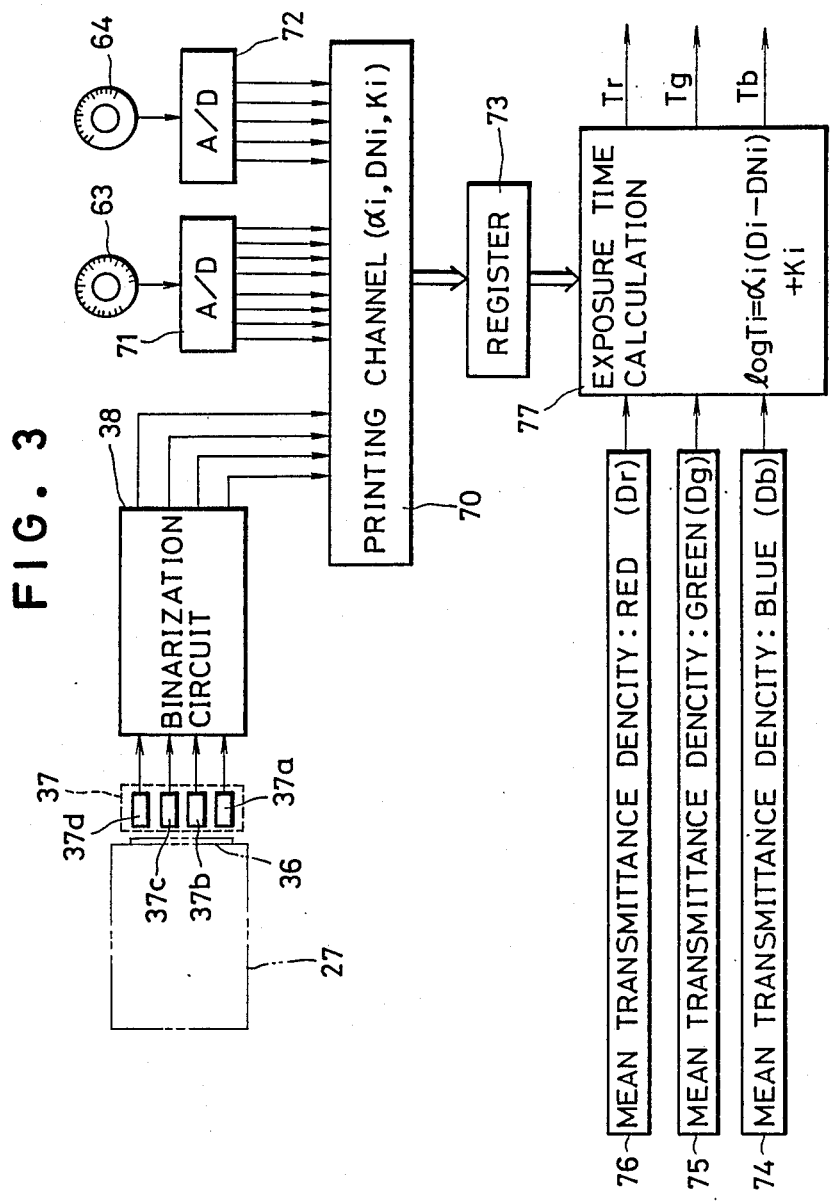
FIG. 3 is a functional block diagram showing the micro-computer of FIG. 1.

As shown in FIG. 3 illustrating the micro-computer in the form of a function block diagram, the code mark reader 37, comprised of four reflection type phot sensors 37a to 37d each of which confronts one of the code marks, transmits the white and black marks 36a to 36d as electric analog signals to the binarization circuit 38 wherein the analog signals are compared with a reference signal to be translated into binary signals which in turn are transmitted to a printing channel section 70. Film balance and lens balance information is entered through the setting dials 63 and 64, respectively, and is also transmitted to the printing channel section 70 after having been converted into a digital form by corresponding A/D converters 71 and 72. According to the combination of the entered information as to paper balance, film balance and lens balance, one of a plurality of printing channels is chosen. Each channel stores previously entered coefficients and constants to be substituted into an exposure calculation equation stored in an exposure time calculation section 77. When one printing channel is chosen, the coefficients and constants are read out and stored temporarily in a register 73. Let it be assumed in this embodiment that there are to be prepared several kinds of balance information; for example four for paper balance, ten for film balance, and fifteen for lens balance, and, in addition, a single master balance. These balances and the number of kinds of balances are to depend on the features of the individual printing apparatus.

Each value of the large-area transmittance densities Di from the photosensor units 42 to 44, for blue, green and red which is temporarily stored in a memory 74, 75, 76 is retrieved upon printing to be transmitted to the exposure time (Ti) calculation section 77. The exposure time calculation section 77 executes calculations to obtain the exposure times by color in accordance with the following equation:

$$\text{Log } T_i = \alpha_i (D_i - DN_i) + K_i$$

wherein
$\alpha_i$ is one of the three primary colors, blue, green and red
i is a constant
$D_i$ is the large-area transmittance density of a picture frame from which a print is made
$DN_i$ is the large-area transmittance density of that standard picture frame which transmits the equivalent components of the three primary colors of printing light
$K_i$ is the exposure time for that standard picture frame.

It is apparent that the values of $\alpha_i$, $DN_i$ and $K_i$ are read out from the chosen printing channel and stored in the register 73.

The sequential operation of the printing apparatus shown in FIGS. 1 to 3 as an embodiment of the present invention will be briefly described below. At the outset, after having mounted the paper supply magazine 27 on the supporting bracket 33, the leader portion of the web-like photographic paper 24 is withdrawn from the paper supply magazine 27 and introduced between the withdrawing rollers 29 and the advancing rollers 30 and then attached to the take-up reel 32 in the paper take-up magazine 31. At the same time, the code mark reader 37 reads the code marks of the code mark section 36 upon the paper supply magazine 27 being placed in position and transmits the code marks as electric analog signals to the binarization circuit 38 wherein the analog signals are binarized.

In order to input the film balance of the color negative film 12 and the lens balance of the projection lens 22, the setting dials 63 and 64 are manually operated. The input information according to the film and lens balances is transmitted to the printing channel section 70 after having been converted into digital form by the A/D converters 71 and 72, respectively, with the result that one of the printing channels can be chosen in accordance with the combination of the input balance information as to the paper balance, the film balance and the lens balance. As a result of this printing channel choice, the coefficient $\alpha_i$ and the constants $DN_i$ and $K_i$ are retrieved from the chosen channel to be stored in the register 73.

On the other hand, the negative carrier 20 advances the color negative film 12 until a frame from which a print is to be made is disposed in the printing station. Because the color filters 13 to 15 are out of the optical path 27 before printing, the light from the white light source 10 illuminates the color negative film 12 after having been sufficiently diffused.

In the above-described condition of the printing apparatus, the micro-computer 39 causes the photosensor units 42 to 44 to transmit the large-area transmittance densities $D_i$ of the picture frame now in the printing station to, and to store them in, the respective memories 74 to 76.

The exposure time calculation section 77 retrieves the data $\alpha_i$, $DN_i$ and $K_i$ from the register 73 and the large area transmittance densities $D_b$, $D_g$ and $D_r$ from the memories 74 to 76 and calculates the exposure times $T_b$, $T_g$ and $T_r$ for the three primary colors by using the equation previously disclosed.

Just after the measurement of the densities $D_i$, the micro-computer 39 causes the shutter drive 25 to open the shutter 23 and to hold it open so as to allow the exposure of the picture frame. At the beginning of exposure, the filter drive 16 keeps the filters 13 to 15 of yellow, magenta and cyan out of the optical path 17 of the projection lens 22. However, the filter drive 16 controls, in cooperation with the timer 59, the filters 13 to 15 to cause them to move into the optical path 17 one after another after the corresponding exposure times $T_b$, $T_g$ and $T_r$ have elapsed so as to block the corresponding complementary color components of the printing light, thereby completing the exposure of the picture frame.

After a time sufficient to expose one frame, the filter drive 25 causes the filters 13 to 15 to retract from the optical path upon closing of the shutter 27. Next, the withdrawing rollers 29, the advancing rollers 30 and the take-up spool 32 start simultaneously to rotate, winding up the exposed part of the photographic paper 24 and advancing an unexposed part thereof into the printing station. On the other hand, the negative carrier 20 advances the color negative film 12 by one picture frame so as to place the next picture frame in the exposure station.

Figure 4:
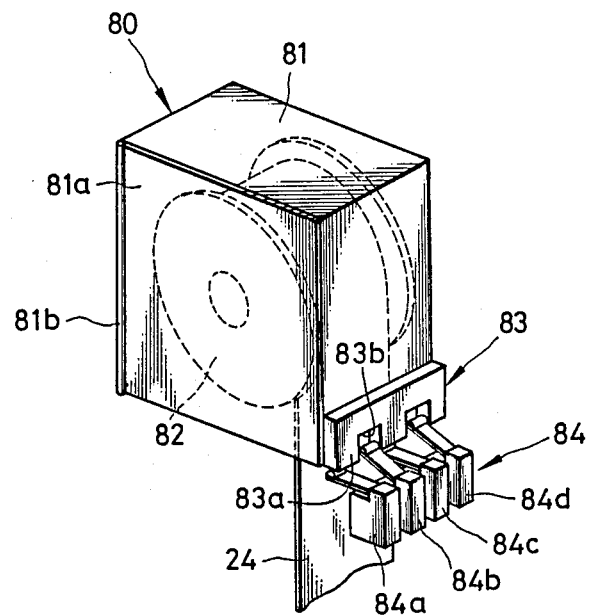
FIG. 4 is a perspective view showing another example of paper magazine.
Figure 5:
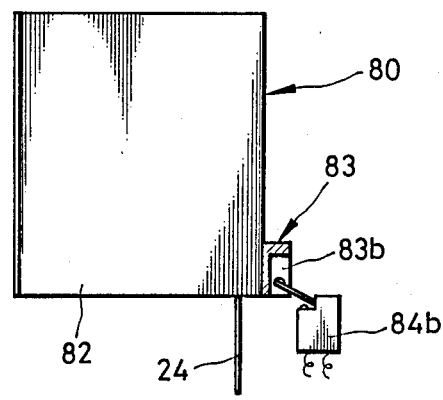
FIG. 5 is a side view showing the paper magazine of FIG. 6, wherein a code mark section is shown in a cross sectional form.

FIGS. 4 and 5 show the paper supply magazine according to another embodiment of the present invention which has a different form of code mark section. The paper supply magazine 80 has a box-like housing 81 with a side cover 81a hinged thereto at 81b for opening and closing movement, and a supply spool 82 disposed in the housing 81. The housing 81 is provided, on a lower portion thereof close to its outlet slot, with a code mark section 83 comprised of lugs 83a and recesses 83b. As in the magazine 27, combinations of the lugs 83a and the recesses 83b indicate the types of photographic papers to be contained in the paper magazine 80. It will be understood by those skilled in the art that these lugs and recesses need only differ from one another and, therefore, it is necessary only that one of two kinds of marks be higher or lower than the other. Accordingly, each recess 17b may be replaced by a hole or a notch.

Corresponding to this modification of the magazine, the code mark reader 37 may also be replaced by a code reader 84 comprised of the same number of micro-switches 84a to 84d as the number of marks in the form of lugs 83a and recesses 83b, each micro-switch 84a to 84d being arranged to face a respective one of the marks. When the magazine 80 is mounted on the supporting bracket 33, only the microswitches 84a and 84c registering with the lugs 83a are turned ON, but the remaining micro-switches 84b and 84d are kept OFF. Consequently, a combination of two kinds of signals is transmitted from the code reader 83 to the microcomputer 39 (see FIG. 1) after having been converted into a binary form by the binarization circuit 38, with the same result as in the embodiment shown in FIGS. 1 to 3.

In the above-described embodiments, although the code mark section is described as including information on the paper balance, it may also include information on the length of photographic paper, etc. If in fact the magazine has a code mark indicating the length of the photographic paper initially contained therein, it is possible to indicate the remaining length of the photographic paper contained therein as a result of the measurement of length of the exposed part thereof.

It will be apparent to those skilled in the art that color positive films can be handled the same as color negative films.

Because certain changes may be made in the abovedescribed photographic apparatus without departing from the scope of the present invention, it is intended that all matter contained in the above description or shown in the accompanying drawings shall be interpreted as illustrative and not limiting.

What is claimed is:

1. A photgraphic printing apparatus for use with a paper megazine containing therein a photgraphic paper on which prints are made, said apparatus comprising:
   means provided on the outside of said paper magazine for indicating the paper type of a photographic paper contained in said paper magazine;
   means provided on said apparatus adapted register with said paper type indication means when said magazine is mounted on said apparatus for detecting said paper type;
   means for determining a printing condition according to said detected paper type; and
   means for making a color print based on the thusdetermined printing condition, thereby to obtain a color print with proper color balance and density;
   said paper type indication means being coded means comprised of a plurality of lugs and a plurality of recesses the particular combination of which informs said detecting means of said paper type.

2. A photographic printing apparatus in which prints are made on a photographic paper contained in a paper magazine having coded means comprised of a plurality of lugs and a plurality of recesses the particular combination of which indicates the paper type of said photographic paper, said apparatus comprising:
   means for reading said coded means to judge the paper type of said photographic paper when said paper magazine is mounted on said apparatus, said reading means comprising a set of microswitches one individual to each of said lugs and to each of said recesses, only some of said microswitches being actuated by said lugs or said recesses the pattern of which enables said reading means to judge the paper type;
   means for determining a printing condition according to said judged paper type: and
   means for making a color print based on the thusdetermined printing condition, thereby to obtain a color print with proper color balance and density.

3. A paper magazine used for a photographic printing apparatus of the type in which a printing condition is determined depending on the type of photographic paper, said paper magazine comprising:
   a housing defining a chamber in which an unexposed photographed paper is contained; and
   coded means provided on the outside of said housing for indicating the paper type of said photographic paper contained in said paper magazine;
   said coded means being comprised of a plurality of lugs and a plurality of recesses the particular combination of which is adapted to inform a said printing apparatus of said paper type.

4. An apparatus as defined in claim 1, said detecting means comprising a set of microswitches one individual to each of said lugs and to each of said recesses, only some of said microswitches being actuated by said lugs or said recesses the pattern of which enables said determining means to judge the paper type.

* * * * *